United States Patent [19]

Owings

[11] Patent Number: 5,762,028
[45] Date of Patent: Jun. 9, 1998

[54] ANIMAL TRAINING DEVICE

[76] Inventor: Jon M. Owings, 715 Hicks Cut Rd., Pulaski, Tenn. 38478

[21] Appl. No.: 629,012

[22] Filed: Apr. 8, 1996

[51] Int. Cl.$^6$ .................................................. A01K 15/00
[52] U.S. Cl. ................................................... 119/712
[58] Field of Search .................. 119/712, 719, 119/174, 905

[56] References Cited

U.S. PATENT DOCUMENTS

| | | | |
|---|---|---|---|
| 479,363 | 7/1892 | Droop | 84/402 |
| 823,713 | 6/1906 | Chein | 84/402 |
| 3,141,370 | 7/1964 | Ross | 84/402 |
| 3,648,925 | 3/1972 | Fryer | 231/212 |
| 3,909,977 | 10/1975 | Kirk | 46/191 |
| 4,911,056 | 3/1990 | Belli et al. | 84/402 |
| 5,107,793 | 4/1992 | Tymkewicz | 119/29 |
| 5,351,653 | 10/1994 | Marischen | 119/719 |
| 5,606,142 | 2/1997 | Volpp | 84/411 R |

*Primary Examiner*—Thomas Price
*Attorney, Agent, or Firm*—Lanier, Ford, Shaver And Payne; Frank M. Caprio

[57] ABSTRACT

The improved animal training device (10) has a handle (12) which comprises a handle top member, a handle bottom member and a handle middle member (12C) and at least one striking plate (14) having a outer striking plate (14A) circumferentially attached to the handle middle member (12C). The improved animal training device (10) functions as an animal behavioral modification device in accord with Pavlovian Conditioning whereas when an animal is performing an undesirable act, a user strikes the improved animal training device (10) on a hard surface such as an animal's head or an inanimate object, thus, producing a high pitched sound emanating from the striking plate (14) which is undesirable to the animal. The striking plate (14) has an optional middle striking plate (14B) circumferentially attached to the outer striking plate (14A). The middle striking plate (14B) has an optional inner striking plate (14C) circumferentially attached therein. The outer striking plate (14A) and the middle striking plate (14B) and the inner striking plate (14C) have varying thicknesses functioning to produce a desired pitch.

7 Claims, 2 Drawing Sheets

ANIMAL TRAINING DEVICE

BACKGROUND OF THE INVENTION

1. Field of the Invention

The present invention relates to an improved dog training device. More particularly, the present invention relates to improved dog training device utilizing adverse sound wave production to modify an animal's behavior.

2. Description of the Prior Art

Animal obedience schools often utilize in their training a rolled newspaper or a metal pie pan as a noise producing device when struck upon an animal. It is well known in the art that the training of animals or in fact of children, the necessary preliminary action is to obtain the attention of that animal or individual. During training, if a sound can be created with little damage or in fact without pain, even by striking the individual, and at the same time creating a sound, the results of endeavors to train will be much more fruitful. The primary purpose of the present invention is to provide a device which emits a sharp sound, can be used to strike a dog or other animal without at the same time harming or hurting or in any way inflicting physical damage to that animal. Concurrently, the sound immediately gains the attention of the animal.

The present invention relates generally to the field of behavior modification of animals. More particularly, the present invention relates to an improved device and technique for controlling animal behavior by a negative audio stimulus for more effective training.

Nearly every owner of the 100 million dogs and cats in the United States longs for a pet to be better trained but often can not afford to have it professionally done, do not have the knowledge themselves or won't spend the time and effort required. Moreover, most pets, at least some of the time, have difficulty understanding what their trainers expect of them. As a result the training process can be long and filled with error.

Numerous innovations for animal training devices have been provided in the prior art that are described as follows. Even though these innovations may be suitable for the specific individual purposes to which they address, they differ from the present invention as hereinafter contrasted.

In U.S. Pat. No. 3,648,925 titled Animal Slapper, invented by Fryer comprises an animal slapper including a handle portion and a slapper portion. The slapper portion is made from a flexible rubberlike material and has a generally flat rectangular or paddle like configuration. Preferably, the slapper portion is made from one or more plies of a flexible fiber reinforced rubber or rubber like material, e.g. a polychloroprene (neoprene) material.

The above described invention differs from the present invention because the patented invention is a flexible slapping device which does not emit a negative audio stimuli as taught by the present invention.

In U.S. Pat. No. 3,909,977 titled Noise Making Clapper invented by Kirk comprises a noise making clapper comprising a stack of a plurality of at least three elongated, flexible blades which are rigidly secured together at a first end. In one embodiment of the invention each blade has a length different from the other blades are coterminous. In another embodiment of the invention, all the blades have the same length, but the blades are successively located in the stack such h that at each end, the blades have a longitudinally overlapping arrangement. Hence, in both embodiments of the invention, the corresponding other ends of the blades have a successively increasing stepped relationship.

The above described invention differs from the present invention because the patented invention is a flexible multi layered slapping device which emits a slapping noise but does not emit a negative audio stimuli as taught by the present invention.

In U.S. Pat. No. 5,107,793 titled Sound Creating Training Device invented by Tymkewicz comprises a training device to create an attention getting sound by striking a surface with the device, the material from which the device is formed producing a relatively loud sound but without painful impact irrespective of the striking vigor.

The above described invention differs from the present invention because the patented invention is a sound producing device lacking a striking plate which comprises a outer striking plate, a middle striking plate, and a inner striking plate which may have varying thicknesses to change the tone of the negative audio stimuli as taught by the present invention.

In U.S. Pat. No. 5,351,653 titled Animal Training Method invented by Marischen et al. comprises a method for training an animal capable of learning to associate a consistent positive audio tone with pleasant feelings. The method includes a consistent positive audio tone capable of being sensed by the animal without startling the animal, and a consistent negative audio tone distinct from the positive audio tone capable of being sensed by the animal and startling the animal. The invention enables a trainer to encourage good behavior by the animal by applying the positive audio tone after the animal has been trained to associate the positive audio tone with pleasant feelings, and to discourage bad behavior by the animal by applying the negative audio tone.

The above described invention differs from the present invention because the patented invention is an electronic sound producing device lacking a striking plate which produces a negative audio stimuli as taught by the present invention.

Numerous innovations for audio animal training devices have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to an improved dog training device. More particularly, the present invention relates to improved dog training device utilizing adverse sound wave production to modify an animal's behavior. The present invention is a humane device utilized as a training aid and/or for behavior modification particularly for dogs. It is used in conjunction with formal obedience training or informal training in the home. The present invention can be utilized in obedience training for numerous bad habits such as wetting or defecating in the house, jumping on people or furniture etc. The device consists of an improved animal training device comprising a lightweight, handled instrument with a striking plate manufactured from thin aluminum. A user strikes an animal gently but firmly on the head which produces a high-pitched "ping" or "bleep" causing surprise and mild discomfort to the animal. Simultaneously with the striking, a user says "No, No", thus Pavlovian Conditioning results upon repetition. By utilizing the device, recurrence of the undesirable behavior in the animal does not occur.

The types of problems encountered in the prior art are animal training often requires inhumane treatments.

In the prior art, unsuccessful attempts to solve this problem were attempted namely: striking an animal with a newspaper or a metal pie pan. However, the problem was solved by the present invention because it is compact and can be held in the pocket of a user and the pitch can be modified in accord with the thickness and material construction of the striking plate.

Innovations within the prior art are rapidly being exploited in the field of animal training.

The present invention went contrary to the teaching of the art which teaches large bulky animal training devices which are inhumane and can injure an animal.

The present invention solved a long felt need for a compact animal training device which is humane.

A synergistic effect and unexpected results were produced by utilizing the present invention due to the following facts and results from experimentation: by utilizing different pitched animal training devices for different levels of Pavlovian Conditioning certain pitched animal training devices can be utilized as a reward (giving food thereafter) as a positive reinforcement where as other pitched animal training devices with a different frequency can be utilized as a deterrent for bad behavior.

Accordingly, it is an object of the present invention to provide An improved animal training device comprising: a handle which comprises a handle top member, a handle bottom member and a handle middle member and at least one striking plate having a outer striking plate circumferentially attached to the handle middle member.

More particularly, it is an object of the present invention to provide a handle which comprises a handle right member and a handle left member having the handle middle member therebetween.

In keeping with these objects, and with others which will become apparent hereinafter, one feature of the present invention resides, briefly stated, in the handle right member which comprises a handle right top member securely attached to a handle right bottom member, the handle left member comprises a handle left top member securely attached to a handle left bottom member.

When the improved animal training device is designed in accordance with the present invention, the striking plate has a middle striking plate circumferentially attached to the outer striking plate.

In accordance with another feature of the present invention, the middle striking plate has an inner striking plate circumferentially attached therein.

Another feature of the present invention is that the outer striking plate and the middle striking plate and the inner striking plate have varying thicknesses.

Yet another feature of the present invention is that the striking plate is constructed from a group of sound producing materials consisting of metal, metal alloy, plastic, plastic composites, plastic derivatives, epoxy, fiberglass, carbon-graphite, rubber, and rubber composites.

Still another feature of the present invention is that the handle is constructed from a group of materials consisting of metal, metal alloy, plastic, plastic composites, epoxy, fiberglass, carbon-graphite, rubber, rubber composites, and wood.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—improved animal training device (12)
12—handle (12)
12R—handle right member (12R)
12RA—handle right top member (12RA)
12RB—handle right bottom member (12RB)
12L—handle left member (12L)
12LA—handle left member top member (12LA)
12LB—handle left member bottom member (12LB)
12C—handle middle member (12C)
14—striking plate (14)
14A—outer striking plate (14A)
14B—middle striking plate (14B)
14C—inner striking plate (14C)

DESCRIPTION OF THE PREFERRED EMBODIMENT

Figure 1:
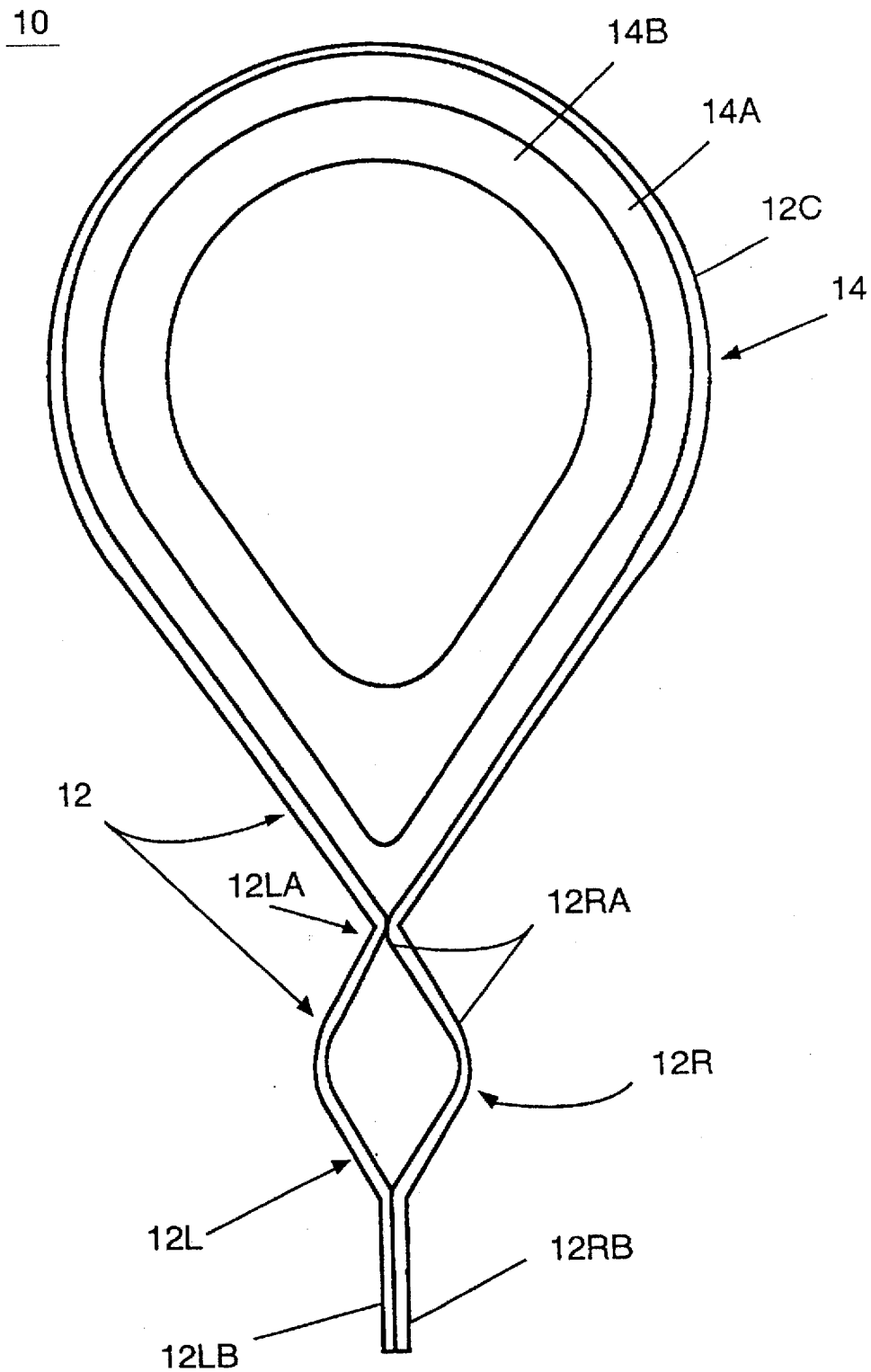
FIG. 1 is a front view of an improved animal training device (12).

Firstly, referring to FIG. 1 which is a front view of an improved animal training device (10). A handle (12) comprises a handle right member (12R) and a handle left member (12L) having a handle middle member (12C) therebetween. A striking plate (14) is circumferentially attached to the handle middle member (12C). The handle middle member (12C) is securely attached at a bottom distal end to a handle right top member (12RA) and a handle left member top member (12LA). The handle right top member (12RA) is securely attached to a handle right bottom member (12RB) preferably forming a bulge therebetween. The handle left top member (12LA) is securely attached to a handle left bottom member (12LB) preferably forming a bulge therebetween.

The handle (12) is constructed from a group of materials consisting of metal, metal alloy, plastic, plastic composites, epoxy, fiberglass, carbon-graphite, rubber, rubber composites, and wood.

The striking plate (14) has a outer striking plate (14A) which is circumferentially securely attached to the handle middle member (12C) by a method of heat welding, spot welding or adhesive welding. The striking plate (14) has an optional middle striking plate (14B) which may have a thickness thinner or thicker than the middle striking plate (14B). The differential of the thickness of the outer striking plate (14A) and the middle striking plate (14B) produces a desired pitch when the improved animal training device (10) is struck upon a hard surface such as a animal's head or a hard inanimate object an then brought in close proximity to an animal's ear. The striking plate (14) has an optional inner striking plate (14C) which may have a thickness thinner or thicker than the middle striking plate (14B) and/or the outer striking plate (14A). The differential of the thickness of the outer striking plate (14A) and/or the middle striking plate (14B) and/or the inner striking plate (14C) produces a desired pitch.

The striking plate (14) is constructed from a group of sound producing materials consisting of metal, metal alloy, plastic, plastic composites, plastic derivatives, epoxy, fiberglass, carbon-graphite, rubber, and rubber composites.

Figure 2:
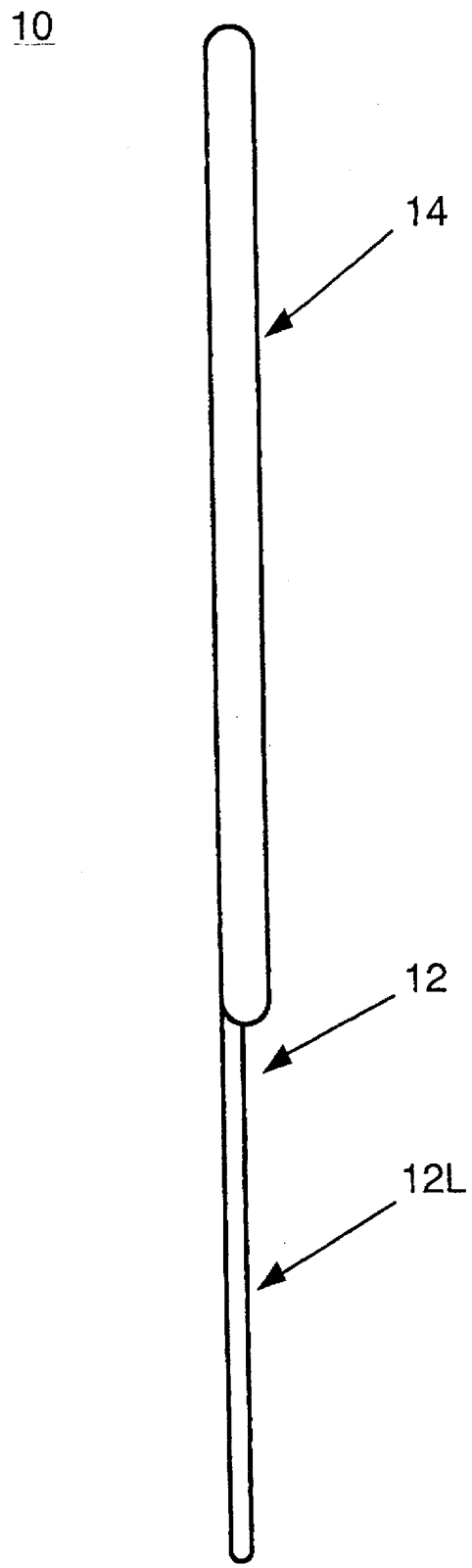
FIG. 2 is a left side view of an improved animal training device (12).

Lastly, referring to FIG. 2 which is a left side view of an improved animal training device (12) exhibiting the handle middle member (12C) having the outer striking plate (14A) wrapped thereover and a handle (12) attached thereto.

It will be understood that each of the elements described above, or two or more together, may also find a useful application in other types of constructions differing from the type described above.

While the invention has been illustrated and described as embodied in animal training device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. An improved animal training device comprising:
   A) a handle including a handle top member, a handle bottom member, a handle middle member, a handle right member and a handle left member, the handle middle member being between the handle right member and the handle left member; and
   B) at least one striking plate having an outer striking plate circumferentially attached to the handle middle member.

2. The improved animal training device as described in claim 1, wherein the handle right member comprises a handle right top member securely attached to a handle right bottom member, and wherein the handle left member comprises a handle left top member securely attached to a handle left bottom member.

3. The improved animal training device as described in claim 1, wherein the striking plate has a middle striking plate circumferentially attached to the outer striking plate.

4. The improved animal training device as described in claim 3, wherein the middle striking plate has an inner striking plate circumferentially attached therein.

5. The improved animal training device as described in claim 4, wherein the outer striking plate and the middle striking plate and the inner striking plate have varying thicknesses.

6. The improved animal training device as described in claim 1, wherein the striking plate is constructed from a material selected from the group consisting of metal, metal alloy, plastic, plastic composites, plastic derivatives, epoxy, fiberglass, carbon-graphite, rubber, and rubber composites.

7. The improved animal training device as described in claim 1, wherein the handle is constructed from a material selected from the group consisting of metal, metal alloy, plastic, plastic composites, epoxy, fiberglass, carbon-graphite, rubber, rubber composites, and wood.

* * * * *